United States Patent
Li et al.

(10) Patent No.: US 6,580,792 B1
(45) Date of Patent: Jun. 17, 2003

(54) SIGNAL DETECTOR WITH AUTOMATIC GAIN CONTROL

(75) Inventors: Jin Li, Austin, TX (US); Yan Zhou, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/225,978

(22) Filed: Jan. 5, 1999

(51) Int. Cl.[7] .............................. H04M 1/00; H04M 9/00
(52) U.S. Cl. ...................... 379/395; 379/395; 379/282; 379/283; 379/386; 370/210; 370/526
(58) Field of Search .................... 379/386, 283, 379/282, 414, 388.03, 390.03, 395; 370/526, 210

(56) References Cited

U.S. PATENT DOCUMENTS

| | | | | |
|---|---|---|---|---|
| 4,689,760 A | * | 8/1987 | Lee et al. | 370/526 |
| 5,163,050 A | * | 11/1992 | Cromack | 370/526 |
| 5,809,133 A | * | 9/1998 | Bartkowiak et al. | 379/386 |
| 5,937,059 A | * | 8/1999 | Kim et al. | 379/386 |
| 6,046,977 A | * | 4/2000 | Bartkowiak | 370/210 |
| 6,111,949 A | * | 8/2000 | Sheets et al. | 379/414 |

* cited by examiner

Primary Examiner—Forester W. Isen
Assistant Examiner—Con P. Tran
(74) Attorney, Agent, or Firm—Williams, Morgan & Amerson P.C.

(57) ABSTRACT

A signal detector includes a transform unit, a gain control unit, and an energy level threshold unit. The transform unit is adapted to receive a plurality of input samples and calculate a first plurality of delay values based on the input samples. Each delay value is based on at least one previous delay value and a current input sample. The transform unit is adapted to calculate a first energy value based on at least a subset of the first plurality of delay values. The gain control unit is adapted to determine if a selected delay value of the first plurality of delay values exceeds a predetermined threshold and scale the selected delay value, the at least one previous delay value used to calculate the selected delay value, and subsequent input samples received after the current input sample by a first amount in response to the selected delay value exceeding the predetermined threshold. The energy level threshold unit is adapted to determine the presence of a first signal in the input samples based on the first energy level.

38 Claims, 3 Drawing Sheets

SIGNAL DETECTOR WITH AUTOMATIC GAIN CONTROL

BACKGROUND OF THE INVENTION

1. Field of the Invention

The present invention relates generally to the detection of signals, such as dual tone multi-frequency (DTMF) coded signals, and more particularly, to detecting signals with improved detection sensitivity by using automatic gain control.

2. Description of the Related Art

DTMF is the signaling standard for the Touch Tone system. Two tones are combined to define a DTMF digit. Table 1 shows the matrix of frequencies used to encode the 16 DTMF symbols on a typical 4×4 matrix telephone keypad. Each DTMF tone consists of two sine waves. One sine wave is from the low-frequency band (row frequency), and the other frequency is from the high-frequency band (column frequency).

TABLE 1

|     | 1209 | 1336 | 1477 | 1633 |
|-----|------|------|------|------|
| 697 | 1    | 2    | 3    | A    |
| 770 | 4    | 5    | 6    | B    |
| 852 | 7    | 8    | 9    | C    |
| 941 | *    | 0    | #    | D    |

Various methods have been used for DTMF generation and detection. Previously, analog circuitry had been used to generate and decode DTMF digits. More recently, the functions have been implemented using digital signal processors (DSP) to improve the accuracy, precision, stability, reprogrammability, and cast. A popular DSP algorithm for DTMF detection is the Goertzel algorithm. One such previous method is described in U.S. Pat. No. 5,644,634, issued to Zheng-yi Xie et al., entitled "System and Method for Dual Tone Multifrequency Detection Using Variable Frame Widths," the specification of which is hereby incorporated by reference in its entirety.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others.

A common technique for determining energy values in the frequency domain is performed by transforming the time domain sampling data to frequency domain data using a variant of the discrete Fourier transform (DFT) called the Goertzel algorithm. The transfer function for the Goertzel algorithm is:

$$H_k = \frac{1 - e^{-j2\pi \frac{k}{N}}}{1 - c \cdot z^{-1} + z^{-2}}, \quad (1)$$

where c is the Goertzel coefficient, $$c = 2\cos\left(2\pi \frac{k}{N}\right)$$

and N is the number of samples in a frame. The value of k is defined by:

$$k = \frac{N}{F_s} \cdot F_{tone}, \quad (2)$$

where $F_s$ is the sampling frequency (i.e., 8 kHz in typical telephone systems), $F_{tone}$ is the frequency nearest the DTMF frequency that keeps the value of k to an integer. The energy of each DTMF frequency is calculated by the feed forward and feedback phase. The feedback phase (i.e., delay value) is calculated as:

$$Q(n) = c \cdot Q(n-1) - Q(n-2) + x(n), \quad (3)$$

where $Q(-1) = Q(-2) = 0$, $n = 0, 1, 2, \ldots, N-1$. $Q(n-1)$ and $Q(n-2)$ are feedback storage elements for a frequency point, and $x(n)$ is the current input sample value. $Q(n)$ is referred to as a delay value.

The energy in each DTMF frequency bin is calculated in the feedforward phase (i.e., n=N) by the equation:

$$E(\text{dtmf}) = Q^2(n-1) + Q^2(n-2) - Q(n-1) \cdot Q(n-2) \cdot c. \quad (4)$$

After the energy of each DTMF frequency is calculated, the largest magnitude in each frequency band is compared to a threshold. If the energy in one of the bins exceeds the threshold, a DTMF tone may be present.

Typically, the calculations performed to generate the Goertzel energy values are performed by a digital signal processor (DSP). On a DSP, different mathematical operations require different numbers of cycles to complete. To increase detection speed, it is desirable to minimize the number of cycles used to complete the energy value calculation. Certain DSPs have limited dynamic range. For example, a fixed point DSP may have a dynamic range of 16-bits. The DSP may encounter difficulty meeting the dynamic range of the input DTMF signal power, which may vary from 0 dBm to −25 dBm, per industry standards.

A DTMF signal having a high signal power can cause the DSP to overflow due to its fixed range. Proposed methods to account for the dynamic range problem have included a fixed value scaling of the input samples or using a double precision implementation to provide increased dynamic range. The scaling method introduces truncation errors into the Goertzel calculation, preventing the signal detector from reliably detecting low power signals (i.e., around −25 dBm). Without scaling, a high power signal will cause the DSP to overflow, preventing reliable detection of the high power signal. Using a double precision implementation greatly increases the number of clock cycles (i.e., about 400 cycles for each sample in the fame) and memory storage locations (i.e., about 32) required to perform the energy calculations.

The present invention is directed to overcoming, or at least reducing the effects of, one or more of the problems set forth above.

SUMMARY OF THE INVENTION

One aspect of the present invention is seen in a signal detector including a transform unit, a gain control unit, and an energy level threshold unit. The transform unit is adapted to receive a plurality of input samples and calculate a first plurality of delay values based on the input samples. Each delay value is based on at least one previous delay value and a current input sample. The transform unit is adapted to calculate a first energy value based on at least a subset of the first plurality of delay values. The gain control unit is adapted to determine if a selected delay value of the first plurality of delay values exceeds a predetermined threshold and scale the selected delay value, the at least one previous delay value used to calculate the selected delay value, and subsequent input samples received after the current input sample by a first amount in response to the selected delay value exceeding the predetermined threshold. The energy level threshold unit is adapted to determine the presence of a first signal in the input samples based on the first energy level.

Another aspect of the present invention is seen in a method for detecting a first signal. A plurality of input samples are received. A first plurality of delay values is calculated based on the input samples. Each delay value is based on at least one previous delay value and a current input sample. It is determined if a selected delay value of the first plurality of delay values exceeds a predetermined threshold. The selected delay value of the second plurality, the at least one previous delay value of the second plurality, and subsequent input samples received after the current input sample are scaled by a first amount in response to the selected delay value exceeding the predetermined threshold. A first energy value is calculated based on at least a subset of the first plurality of delay values. The presence of the first signal in the input samples is determined based on the first energy level.

BRIEF DESCRIPTION OF THE DRAWINGS

Other objects and advantages of the invention will become apparent upon reading the following detailed description and upon reference to the drawings in which.

Figure 1:
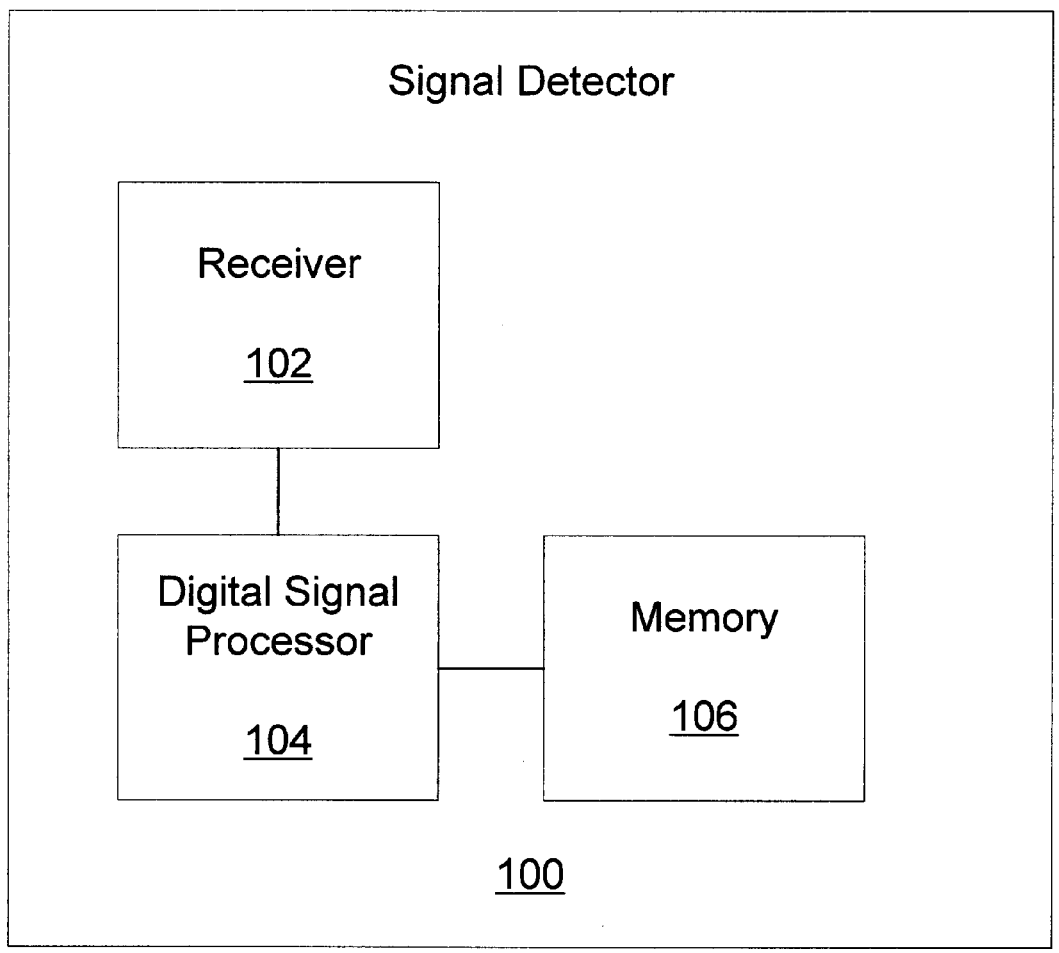
FIG. 1 is a block diagram of a signal detector in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a signal detector 100 is provided. The signal detector 100 includes a receiver 102, a digital signal processor 104, and a memory 106. The receiver 102 receives an analog signal and converts the analog signal into digital format. The receiver 102 samples the analog signal and utilizes pulse code modulation (PCM) or other suitable techniques to produce corresponding digital data. The receiver 102 may include linear analog to digital (A/D) converters (not shown). In the illustrated embodiment, the receiver 102 samples at a frequency of 8kHz, a common sampling frequency used in telephone systems.

It is noted that the received signal may be compressed or companded, and thus digital data produced by the A/D converter (not shown) in the receiver 102 may be companded (i.e., may comprise logarithmically compressed digital data). As is well-known in the art, companding refers to logarithmically compressing a signal at the source and expanding the signal at the destination to obtain a high end-to-end dynamic range while reducing dynamic range requirements within the communication channel. If the signal is companded, the receiver 102 logarithmically expands the data to a linear format. It is also contemplated that the signal detector 100 may receive digital signals (i.e., linear or logarithmic) directly, and thus a receiver 102 is not required in the signal detector 100 for analog to digital conversion.

The frequency domain energy values calculated for the DTMF frequencies are used to determine the presence of a DTMF signal. A variety of tests known in the art may be performed to determine the presence of a valid DMTF signal and to reject false detections caused by imitation signals, such as noise, voice, or music. The series of tests performed on the energy values are referred to as post-processing tests. In the illustrated embodiment, the generation of the energy values and the post processing tests are performed by the digital signal processor 104.

The memory 106 may be a read-only memory, a random access memory, or a combination thereof. The memory 106 may be employed to store program instructions for execution by the digital signal processor 104. Also, results of calculations completed by the digital signal processor 104 may be stored in the memory 106. It is also contemplated that a microprocessor (not shown) or other type of general purpose processor (not shown) may be used to perform any or all of the functions of the receiver 102 and/or the digital signal processor 104. In the illustrated embodiment, the digital signal processor 104 is an ADSP-2181, sold by Analog Devices, Inc.

Figure 2:
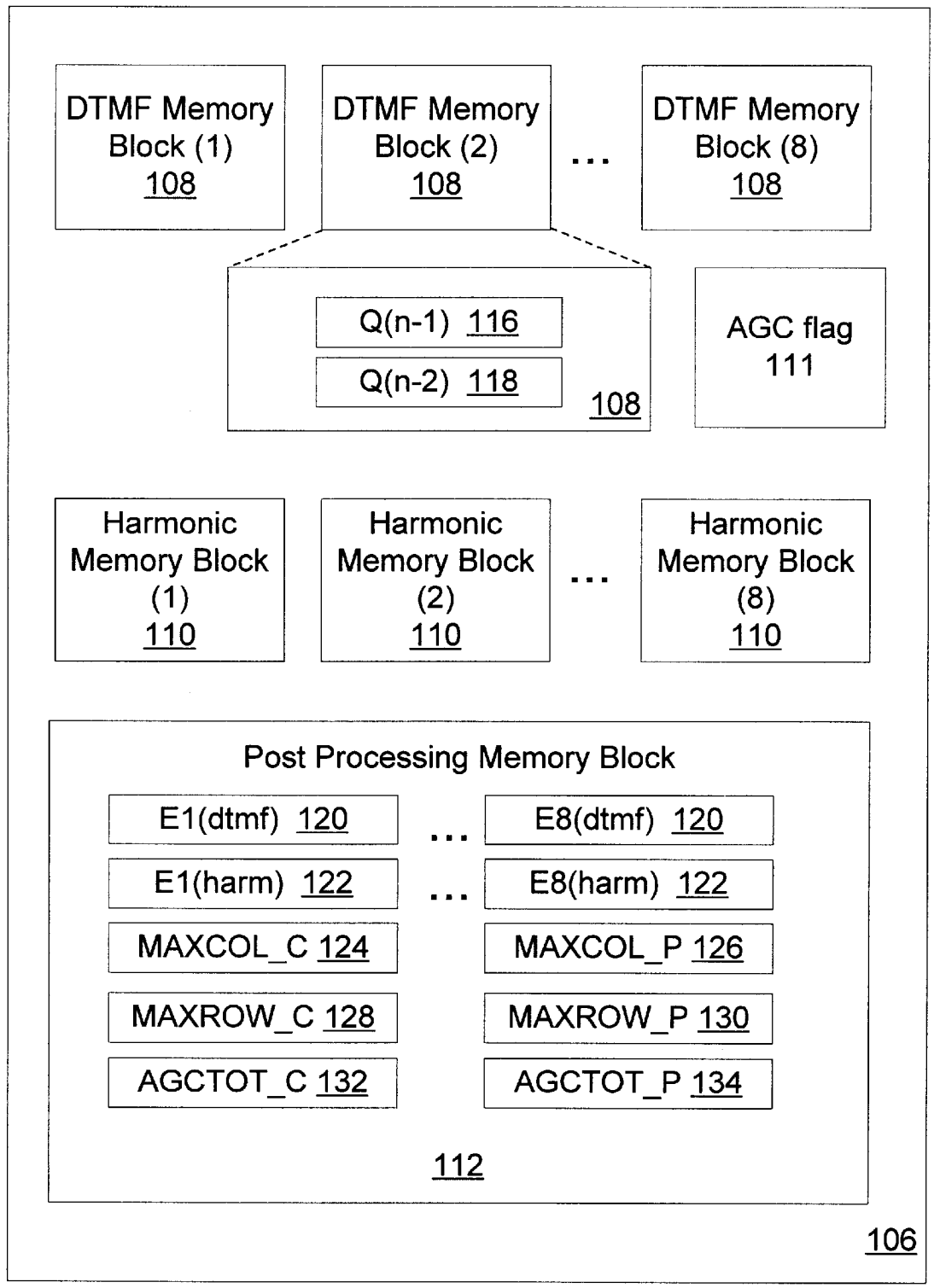
FIG. 2 is a diagram illustrating the partitioning of a memory in the signal detector of FIG. 1.

Referring to FIG. 2, a block diagram illustrating the partitioning of the memory 106 for the calculation of the DTMF energy values is provided. The memory 106 is partitioned into eight DTMF memory blocks 108 for determining the energy values for the DTMF frequencies, eight harmonic memory blocks 110 for determining the energy values for the second harmonics of the DTMF frequencies, an automatic gain control (AGC) flag 111, and a post processing memory block 112 for storing the calculated energy values and the results of post processing determinations.

Each of the DTMF memory blocks 108 and harmonic blocks 110 includes a first delay term 116 (i.e., Q(n−1) ) and a second delay term 118 (i.e., Q(n−2) ). The post processing memory block 112 includes an energy value 120 (i.e., E(dtmf) ) for each of the DTMF frequencies and a energy value 122 (i.e., E(harm) ) for the harmonics. The post processing memory block 112 also includes a MAXCOL_C field 124 representing the largest column frequency energy value for the current frame, a MAXCOL_P field 126 representing the largest column frequency energy value for the previous frame, a MAXROW_C field 128 representing the largest row frequency energy value for the current frame, and a MAXROW_P field 130 representing the largest row frequency energy value for the previous frame. The total number of AGC scaling events (i.e., corresponding to the number of times the AGC flag 111 is set) for the current and previous frames are stored in an AGCTOT_C field 132 and an AGCTOT_P field 134, respectively.

Other values may be stored in the memory 106, depending on the specific implementation and the specific tests being performed. For clarity, only those values useful for illustrating the present invention are shown and discussed herein.

During the calculation of the delay values 116, 118 the input sample, x(n) from the receiver 102 is scaled by one bit to ensure that its value is less than or equal to 0.5. To a binary value, such as the input sample x(n), a right shifting operation is performed. In a right shifting operation, the least significant bit is dropped, the remaining bits are shifted to the right, and the most significant bit becomes a zero if the sample value is positive and a one if the most significant bit is negative.

During each cycle of the Goertzel calculation, the delay value, Q(n), is calculated using equation 3. If the delay value, Q(n), exceeds 0.25, the AGC flag 111 is set to implement automatic gain control. With the AGC flag 111 set, in the next cycle the input sample, x(n) is scaled down by an additional bit. Also, all of the values 116, 118 are scaled down by one bit. By scaling the values, the next delay value is prevented from causing an overflow condition (i.e., c<2, Q(n−1), Q(n−2)<=0.25, and x(n)<0.5; therefore, Q(n) <1).

If a subsequent delay value, Q(n), again exceeds 0.25 another bit in the AGC flag 111 is set and the scaling operation is repeated. The values are scaled only if they become sufficiently large to provide a potential for an overflow condition. Accordingly, sensitivity is not lost for detecting low power signals, and due to the automatic gain scaling, a high power signal will not cause an overflow condition.

In the illustrated embodiment, the AGC flag 111 may be set up to five times, resulting in a maximum scaling of six bits (i.e., the initial scaling of x(n) did not result in setting the AGC flag 111). At the end of a frame of input samples, x(n), the values 116, 118 are scaled up one bit using a left shifting operation to compensate for the initial scaling that was performed on the input sample, x(n) without setting the AGC flag 111. Then, the energy values, E(dtmf), E(harm) for the DTMF and harmonic frequencies are calculated using equation 4 and stored in the corresponding energy values 120, 122. Because the delay values, Q(n−1), Q(n−2), after the left shifting operation, are less than 0.5, the energy value calculated in equation 4 will not overflow. The resulting energy values are essentially floating point values with the values stored in the energy values 120, 122 representing the fractional portion, and the value in the AGCTOT_C field 132 representing the exponential portion. The largest column and row energy values from the energy values 120 are stored in the MAXCOL_C field 124 and the MAXROW_C field 128, respectively.

Figure 3:
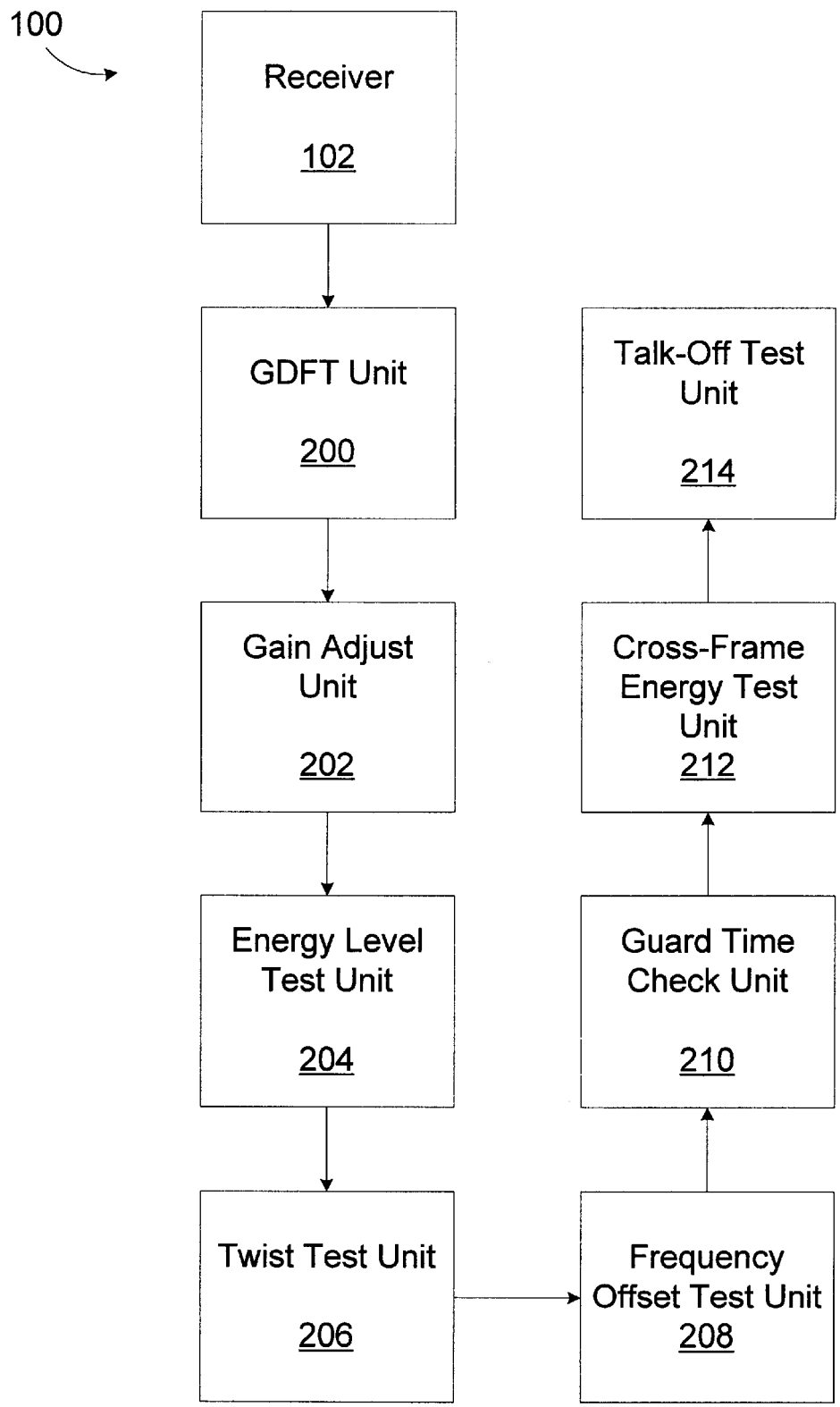
FIG. 3 is a functional block diagram of the signal detector of FIG. 1.

A functional block diagram of the signal detector 100 is provided in FIG. 3. The signal detector 100 includes the receiver 102 adapted to sample the input signal, and a Goertzel Discrete Fourier Transform (GDFT) unit 200 adapted to transform the time domain samples of the receiver 102 to frequency domain energy values using the equations and the automatic gain scaling technique described above. The GDFT unit 200 performs energy level calculations for each of the eight DTMF frequencies and their second harmonics (i.e., 16 values total).

For purposes of illustration, exemplary post processing tests are described. It is contemplated that only a portion of these tests may be employed by the signal detector 100, or other additional tests may be included. To perform the post processing tests the signal detector 100 includes a gain unit 202 adapted to scale the output of the GDFT unit 200 based on any asymmetry in frame widths between the frequencies. A signal detector having frame widths optimized for the various DTMF frequencies is described in U.S. patent application Ser. No. 09/196,258, entitled "SIGNAL DETECTOR WITH MATCHED FILTER COEFFICIENT," and incorporated herein by reference in its entirety.

The signal detector 100 also includes an energy level test unit 204 adapted to compare the largest row and column DTMF energy values to a minimum threshold, and a twist test unit 206 adapted to determine if the power level difference between the largest row and column energy values is within a limit. A frequency offset test unit 208 is adapted to determine if the frequency offset of each DTMF frequency is within a limit, and a guard time check unit 210 is adapted to determine if the DTMF tone has an acceptable duration (i.e., greater than 23 ms). A cross-frame energy test unit 212 is adapted to determine if the maximum energy of the two DTMF tones is consistent across two consecutive frames, and a talk-off test unit 214 is adapted to test the second harmonics of the DTMF frequencies to determine if a DTMF detection might have been simulated by speech. The specific functions and algorithms to implement the post processing tests described above are known in the art and, for clarity, they are not further described herein unless necessary to illustrate the application of the present invention. Also, it is contemplated that the tests illustrated in FIG. 3 may be performed in an order different from that shown, depending on the specific implementation.

The test performed by the energy level test unit 204 may be affected by automatic gain scaling. If the value of the AGCTOT_C field 132 is greater than 1, the normal threshold based energy level test is skipped (i.e., if the energy has been scaled, by default it is greater than the threshold).

The test performed by the cross-frame energy test unit 212 is also affected by automatic gain scaling. A normal cross-frame energy level test is defined by the equations:

$$|MAXROW\_C - MAXROW\_P| < 1.0 dB \qquad (5)$$

$$|MAXCOL\_C - MAXCOL\_P| < 1.0 dB \qquad (6)$$

If either of the equations 5 and 6 evaluate to false, the detection is abandoned.

To conduct the cross-frame energy test and compensate for automatic gain scaling, the AGCTOT_C field 132 and the AGCTOT_P field 134 are compared. If their difference equals zero (i.e., they are equal), they have been scaled by an equal factor, and the normal tests defined in equations 5 and 6 may be performed. If AGCTOT_C—AGCTOT_P equals 1, the MAXCOL_C field 124 and the MAXROW_C field 128 are scaled down by one bit before the cross-frame energy test is performed. Likewise, if AGCTOT_P—AGCTOT_C equals 1, the MAXCOL_P field 126 and the MAXROW_P field 130 are scaled down by one bit before the cross-frame energy test is performed. If the magnitude of the difference is greater than 1, the cross-frame energy test is skipped and the detection is abandoned without further calculation, because the energy difference between the current frame and the previous frame is too great.

During or after completion of the post processing tests described above, it is contemplated that the digital signal processor 104 may set a flag (not shown) in the memory 106 to indicate the detection or non-detection of a DTMF signal.

Using automatic gain control as described above to control the dynamic range of the signal detector 100 has numerous advantages. The sensitivity of the signal detector 100 to low power signals can be maintained without exposing the signal detector to an overflow condition if a high power signal is received. Also, the additional overhead (e.g., memory and DSP cycles) required to support an automatic gain scaling implementation is significantly less than that required to transition to a double precision implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A signal detector, comprising:
   a transform unit adapted to receive a plurality of input samples, calculate a first plurality of delay values based on the input samples, each delay value being based on at least one previous delay value and a current input sample, and calculate a first energy value based on at least a subset of the first plurality of delay values;
   a gain control unit adapted to determine if a selected delay value of the first plurality of delay values exceeds a predetermined threshold and scale the selected delay value, the at least one previous delay value used to calculate the selected delay value, and subsequent input samples received after the current input sample by a first amount in response to the selected delay value exceeding the predetermined threshold; and
   an energy level threshold unit adapted to determine the presence of a first signal in the input samples based on the first energy level.

2. The signal detector of claim 1, wherein each delay value is based on at least two previous delay values and the gain control unit is adapted to scale the at least two previous delay values used to calculate the selected delay value by the first amount in response to the selected delay value exceeding the predetermined threshold.

3. The signal detector of claim 1, wherein the predetermined threshold is about 0.25.

4. The signal detector of claim 1, wherein the first amount is about one half.

5. The signal detector of claim 1, wherein the gain scaling unit is adapted to scale the selected delay value, the at least one previous delay value used to calculate the selected delay value, and the subsequent input samples by performing a right shifting operation.

6. The signal detector of claim 1, wherein the gain control unit is adapted to determine if a second selected delay value of the subsequent delay values exceeds the predetermined threshold and scale the second selected delay value, the at least one previous delay value used to calculate the second selected delay value, and the subsequent input samples received after the current input sample associated with the second selected delay value by a second amount in response to the second selected delay value exceeding the predetermined threshold.

7. The signal detector of claim 6, wherein the predetermined threshold is about 0.25.

8. The signal detector of claim 6, wherein the second amount is about one half.

9. The signal detector of claim 6, wherein the gain scaling unit is adapted to scale the second selected delay value, the at least one previous delay value used to calculate the second selected delay value, and the subsequent input samples received after the current input sample associated with the second selected delay value by performing a right shifting operation.

10. The signal detector of claim 1, wherein the energy value includes a gain control total based on the number of times the gain control unit scaled the first plurality of delay values.

11. The signal detector of claim 10, wherein the energy level threshold unit is adapted to provide a positive detection indicator if the gain control total is at least one.

12. The signal detector of claim 1, wherein the transform unit is adapted to calculate a second plurality of delay values based on the input samples and calculate a second energy value based on at least a subset of the second plurality of delay values, each delay value of the second plurality is based on at least one previous delay value of the second plurality and the current input sample, the gain control unit is adapted to determine if a selected delay value of the second plurality exceeds the predetermined threshold, and scale the selected delay value of the second plurality, the at least one previous delay value of the second plurality, and subsequent input samples received after the current input sample by the first amount in response to the selected delay value of the second plurality exceeding the predetermined threshold, and the energy level threshold unit is adapted to determine the presence of a second signal in the input samples based on the second energy level.

13. The signal detector of claim 12, wherein the first energy level includes a first gain control total indicating the number of times the gain control unit scaled the input samples in calculating the first plurality of delay values, and the second energy level includes a second gain control total indicating the number of times the gain control unit scaled the input samples in calculating the second plurality of delay values.

14. The signal detector of claim 13, wherein the energy level threshold unit is adapted to determine the presence of the second signal in the input samples based on the second gain control total being at least one.

15. The signal detector of claim 13, further comprising a cross-frame energy test unit adapted to receive the first and second gain control totals and compare the first and second gain control totals to determine the presence of the first and second signals.

16. The signal detector of claim 15, wherein the cross-frame energy test unit is adapted to designate a non-detection condition if the absolute difference between the first and second gain control factors is at least 2.

17. The signal detector of claim 15, wherein the gain control unit is adapted to scale the one of the first and second energy values having the greater of the first and second gain control totals by the predetermined factor to generate a scaled energy value, and the cross-frame energy test unit is adapted to compare the lesser of the first and second energy values to the scaled energy value to determine the presence of the first and second signals.

18. The signal detector of claim 1, wherein the transform unit is adapted to receive a plurality of unscaled input samples, and the gain control unit is adapted to scale the unscaled input samples by the predetermined factor to generate the plurality of input samples.

19. A signal detector for detecting a first signal, comprising:
a processor adapted to receive a plurality of input samples; and
a memory device coupled to the processor and adapted to store program instructions, that when executed by the processor:
calculate a first plurality of delay values based on the input samples, each delay value being based on at least one previous delay value and a current input sample;
determine if a selected delay value of the first plurality of delay values exceeds a predetermined threshold;
scale the selected delay value, the at least one previous delay value used to calculate the selected delay value, and subsequent input samples received after the current input sample by a first amount in response to the selected delay value exceeding the predetermined threshold; and
calculate a first energy value based on at least a subset of the first plurality of delay values; and
determine the presence of a first signal in the input samples based on the first energy level.

20. A method for detecting a first signal, comprising:
receiving a plurality of input samples;
calculating a first plurality of delay values based on the input samples, each delay value being based on at least one previous delay value and a current input sample;
determining if a selected delay value of the first plurality of delay values exceeds a predetermined threshold;
scaling the selected delay value, the at least one previous delay value used to calculate the selected delay value, and subsequent input samples received after the current input sample by a first amount in response to the selected delay value exceeding the predetermined threshold;
calculating a first energy value based on at least a subset of the first plurality of delay values; and
determining the presence of the first signal in the input samples based on the first energy level.

21. The method of claim 1, wherein calculating the first plurality of delay values includes calculating each delay value based on at least two previous delay values.

22. The method of claim 1, wherein determining if the selected delay value of the first plurality of delay values exceeds the predetermined threshold, includes determining if the selected delay value exceeds about 0.25.

23. The method of claim 20, wherein scaling by the first amount includes scaling by about one half.

24. The method of claim 20, wherein scaling by the first amount includes performing a right shifting operation.

25. The method of claim 20, further comprising:
determining if a second selected delay value of the subsequent delay values exceeds the predetermined threshold; and
scaling the second selected delay value, the at least one previous delay value used to calculate the second selected delay value, and the subsequent input samples received after the current input sample associated with the second selected delay value by a second amount in response to the second selected delay value exceeding the predetermined threshold.

26. The method of claim 25, wherein determining if the second selected delay value of the first plurality of delay values exceeds the predetermined threshold, includes determining if the second selected delay value exceeds about 0.25.

27. The method of claim 25, wherein scaling by the second amount includes scaling by about one half.

28. The method of claim 25, wherein scaling by the second amount includes performing a right shifting operation.

29. The method of claim 20, wherein calculating the first energy value includes determining a gain control total based on the number of times the first plurality of delay values were scaled.

30. The method of claim 29, wherein determining the presence of the first signal in the input samples based on the first energy level includes determining if the gain control total is at least one.

31. The method of claim 20, further comprising:
calculating a second plurality of delay values based on the input samples, each delay value of the second plurality being based on at least one previous delay value of the second plurality and the current input sample;
determining if a selected delay value of the second plurality of delay values exceeds the predetermined threshold;
scaling the selected delay value of the second plurality, the at least one previous delay value of the second plurality, and subsequent input samples received after the current input sample by the first amount in response to the selected delay value of the second plurality exceeding the predetermined threshold;
calculating a second energy value based on at least a subset of the second plurality of delay values; and
determining the presence of a second signal in the input samples based on the second energy level.

32. The method of claim 31, wherein calculating the first energy value includes determining a first gain control total based on the number of times the first plurality of delay values were scaled, and calculating the second energy value includes determining a second gain control total based on the number of times the second plurality of delay values were scaled.

33. The method of claim 32, wherein determining the presence of the second signal in the input samples based on the second energy value includes determining if the second gain control total is at least one.

34. The method of claim 32, further comprising comparing the first and second gain control totals to determine the presence of the first and second signals.

35. The method of claim 34, wherein determining the presence of the first and second signals includes designating a non-detection condition if the absolute difference between the first and second gain control factors is at least 2.

36. The method of claim 34, further comprising scaling the one of the first and second energy values having the greater of the first and second gain control totals by the predetermined factor to generate a scaled energy value, and wherein comparing the first and second gain control totals includes compare the lesser of the first and second energy values to the scaled energy value to determine the presence of the first and second signals.

37. The method of claim 20, further comprising:
receiving a plurality of unscaled input samples; and
scaling the unscaled input samples by the predetermined factor to generate the plurality of input samples.

38. A signal detector, comprising:

means for receiving a plurality of input samples;

means for calculating a first plurality of delay values based on the input samples, each delay value being based on at least one previous delay value and a current input sample;

means for determining if a selected delay value of the first plurality of delay values exceeds a predetermined threshold;

means for scaling the selected delay value, the at least one previous delay value used to calculate the selected delay value, and subsequent input samples received after the current input sample by a first amount in response to the selected delay value exceeding the predetermined threshold;

means for calculating a first energy value based on at least a subset of the first plurality of delay values; and means for determining the presence of the first signal in the input samples based on the first energy level.

* * * * *